(12) United States Patent
Lee et al.

(10) Patent No.: US 8,593,156 B2
(45) Date of Patent: *Nov. 26, 2013

(54) SENSOR ASSEMBLY AND MICROWAVE EMITTER FOR USE IN A SENSOR ASSEMBLY

(75) Inventors: Yongjae Lee, Niskayuna, NY (US); Boris Leonid Sheikman, Minden, NV (US); Steven Go, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 12/951,602

(22) Filed: Nov. 22, 2010

(65) Prior Publication Data
US 2012/0126831 A1      May 24, 2012

(51) Int. Cl.
*G01R 27/04*      (2006.01)
*G01R 27/32*      (2006.01)

(52) U.S. Cl.
USPC .......................................... 324/637; 324/644

(58) Field of Classification Search
USPC ................................................ 324/637, 644
See application file for complete search history.

(56) References Cited

U.S. PATENT DOCUMENTS

| | | |
|---|---|---|
| 4,045,727 A | 8/1977 | Yu et al. |
| 4,313,118 A | 1/1982 | Calvin |
| 4,346,383 A | 8/1982 | Woolcock et al. |
| 4,384,819 A | 5/1983 | Baker |
| 4,652,864 A | 3/1987 | Calvin |
| 4,845,422 A | 7/1989 | Damon |
| 4,862,061 A | 8/1989 | Damon |
| 5,097,227 A | 3/1992 | Yuan et al. |
| 5,227,667 A | 7/1993 | Takinami et al. |
| 5,334,969 A | 8/1994 | Abe et al. |
| 5,459,397 A | 10/1995 | Spillman, Jr. |
| 5,459,405 A | 10/1995 | Wolff et al. |
| 5,506,515 A | 4/1996 | Godshalk et al. |
| 5,670,886 A | 9/1997 | Wolff et al. |
| 5,801,530 A | 9/1998 | Crosby et al. |
| 5,818,242 A | 10/1998 | Grzybowski et al. |
| 5,854,994 A | 12/1998 | Canada et al. |
| 5,963,034 A | 10/1999 | Mahapatra et al. |
| 5,992,237 A | 11/1999 | McCarty et al. |
| 6,043,774 A | 3/2000 | Singh et al. |
| 6,118,287 A | 9/2000 | Boll et al. |
| 6,227,703 B1 | 5/2001 | DiMatteo et al. |
| 6,261,247 B1 | 7/2001 | Ishikawa et al. |
| 6,320,550 B1 | 11/2001 | Van Voorhies |
| 6,407,562 B1 | 6/2002 | Whiteman |
| 6,437,751 B1 | 8/2002 | Craven et al. |
| 6,445,995 B1 | 9/2002 | Mollmann |
| 6,462,561 B1 | 10/2002 | Bigelow et al. |
| 6,620,057 B1 | 9/2003 | Pirritano et al. |
| 6,750,621 B2 | 6/2004 | Gandrud |
| 6,778,132 B2 | 8/2004 | Palata |
| 6,864,796 B2 | 3/2005 | Lehrman et al. |
| 6,878,147 B2 | 4/2005 | Prakash et al. |
| 6,984,994 B2 | 1/2006 | Gregg |

(Continued)

*Primary Examiner* — Amy He
(74) *Attorney, Agent, or Firm* — Jason K. Klindtworth

(57) ABSTRACT

A microwave emitter for use in a microwave sensor assembly that includes an emitter body includes a first arm that extends radially outward from the emitter body. The first arm is at least partially non-linear and includes at least one peak and at least one trough. The microwave emitter also includes a second arm that extends radially outward from the emitter body. The second arm includes at least one peak and at least one trough. The first arm and the second arm generate an electromagnetic field when at least one microwave signal is received.

20 Claims, 5 Drawing Sheets

(56) References Cited

U.S. PATENT DOCUMENTS

| | | |
|---|---|---|
| 7,073,384 B1 | 7/2006 | Donskoy et al. |
| 7,079,029 B2 | 7/2006 | Tsuji |
| 7,079,030 B2 | 7/2006 | Tsuji |
| 7,119,737 B2 | 10/2006 | Tsuji |
| 7,159,774 B2 | 1/2007 | Woodard et al. |
| 7,176,829 B2 | 2/2007 | Tsuji |
| 7,206,719 B2 | 4/2007 | Lindsay et al. |
| 7,215,111 B2 | 5/2007 | Kaneyasu et al. |
| 7,215,252 B2 | 5/2007 | Schenck |
| 7,250,920 B1 | 7/2007 | Steinbrecher |
| 7,256,376 B2 | 8/2007 | Tsuji |
| 7,274,189 B2 | 9/2007 | Chen et al. |
| 7,318,824 B2 | 1/2008 | Prakash et al. |
| 7,423,934 B1 | 9/2008 | Uzes |
| 7,455,495 B2 | 11/2008 | Leogrande et al. |
| 7,483,800 B2 | 1/2009 | Geisheimer et al. |
| 7,492,165 B2 | 2/2009 | Maier et al. |
| 7,527,623 B2 | 5/2009 | Prakash et al. |
| 7,532,151 B2 | 5/2009 | Touge et al. |
| 7,541,995 B1 | 6/2009 | Murphy, Jr. |
| 7,554,324 B2 | 6/2009 | Gualtieri |
| 7,604,413 B2 | 10/2009 | Koike et al. |
| 2008/0303513 A1 | 12/2008 | Turner |
| 2009/0102451 A1 | 4/2009 | Kwark |
| 2009/0243915 A1 | 10/2009 | Nishizato et al. |
| 2010/0125269 A1 | 5/2010 | Emmons et al. |
| 2010/0211334 A1 | 8/2010 | Sheikman et al. |

SENSOR ASSEMBLY AND MICROWAVE EMITTER FOR USE IN A SENSOR ASSEMBLY

BACKGROUND OF THE INVENTION

The present application relates generally to power systems and, more particularly, to a sensor assembly and a microwave emitter for use in a sensor assembly.

Known machines may exhibit vibrations and/or other abnormal behavior during operation. One or more sensors may be used to measure and/or monitor such behavior and to determine, for example, an amount of vibration exhibited in a machine drive shaft, a rotational speed of the machine drive shaft, and/or any other operational characteristic of an operating machine or motor. Often, such sensors are coupled to a machine monitoring system that includes a plurality of monitors. The monitoring system receives signals from one or more sensors, performs at least one processing step on the signals, and transmits the modified signals to a diagnostic platform that displays the measurements to a user.

At least some known machines use eddy current sensors to measure the vibrations in and/or a position of a machine component. However, the use of known eddy current sensors may be limited because a detection range of such sensors is only about half of a width of the eddy current sensing element. Other known machines use optical sensors to measure a vibration and/or a position of a machine component. However, known optical sensors may become fouled by contaminants and provide inaccurate measurements, and as such, may be unsuitable for industrial environments. Moreover, known optical sensors may not be suitable for detecting a vibration and/or a position of a machine component through a liquid medium and/or a medium that includes particulates.

BRIEF DESCRIPTION OF THE INVENTION

In one embodiment, a microwave emitter for use in a microwave sensor assembly that includes an emitter body is provided that includes a first arm that extends radially outward from the emitter body. The first arm is at least partially non-linear and includes at least one peak and at least one trough. The microwave emitter also includes a second arm that extends radially outward from the emitter body. The second arm includes at least one peak and at least one trough. The first arm and the second arm generate an electromagnetic field when at least one microwave signal is received.

In another embodiment, a microwave sensor assembly is provided that includes an emitter body and a microwave emitter coupled to the emitter body. The microwave emitter includes a first arm that extends radially outward from the emitter body. The first arm is at least partially non-linear and includes at least one peak and at least one trough. The microwave emitter also includes a second arm that extends radially outward from the emitter body. The second arm includes at least one peak and at least one trough. The first arm and the second arm generate an electromagnetic field when at least one microwave signal is received. A signal processing device is coupled to the microwave emitter for transmitting at least one microwave signal to the microwave emitter and for calculating a proximity measurement based on a signal received from the microwave emitter.

In yet another embodiment, a power system is provided that includes a machine and a microwave probe positioned with respect to the machine. The microwave probe includes an emitter body and a microwave emitter coupled to the emitter body. The microwave emitter includes a first arm that extends radially outward from the emitter body. The first arm is at least partially non-linear and includes at least one peak and at least one trough. The microwave emitter also includes a second arm that extends radially outward from the emitter body. The second arm includes at least one peak and at least one trough. The first arm and the second arm generate an electromagnetic field when at least one microwave signal is received. A signal processing device is coupled to the microwave emitter for transmitting at least one microwave signal to the microwave emitter and for calculating a proximity measurement based on a signal received from the microwave emitter.

DETAILED DESCRIPTION OF THE INVENTION

Figure 1:
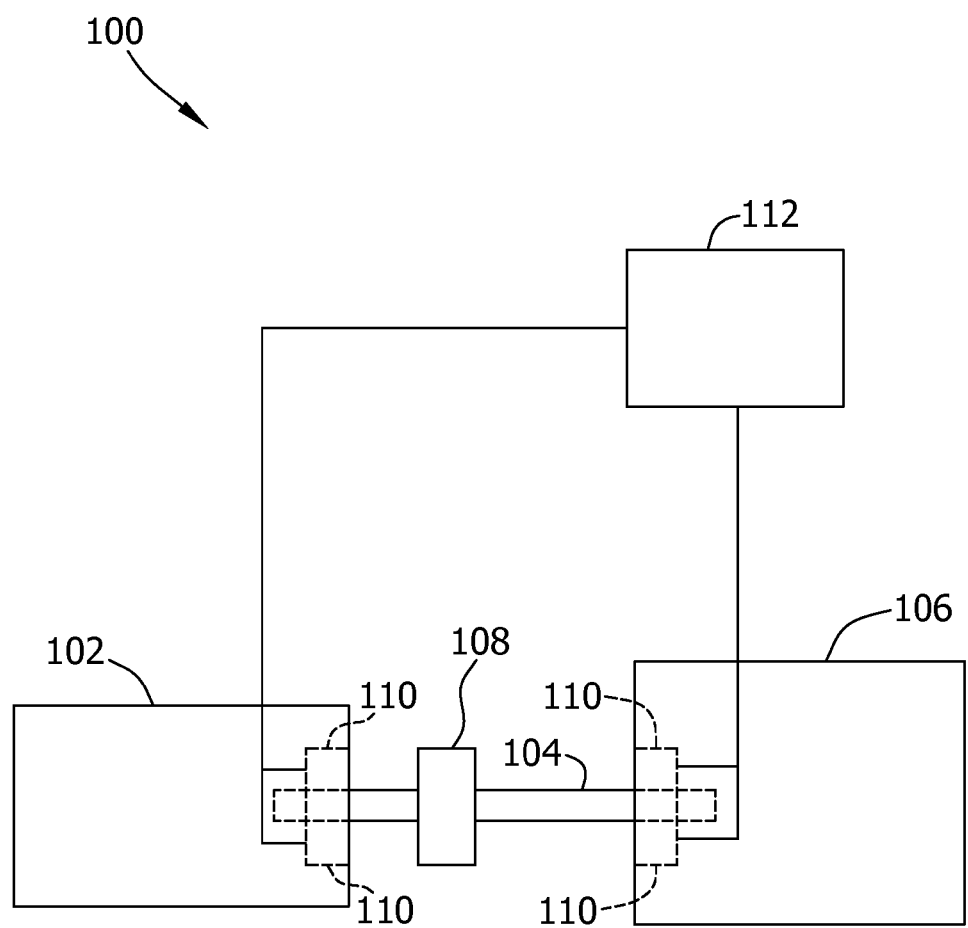
FIG. 1 is a block diagram of an exemplary power system.

FIG. 1 shows an exemplary power system 100 that includes a machine 102. In the exemplary embodiment, machine 102 may be, but is not limited to only being, a wind turbine, a hydroelectric turbine, a gas turbine, or a compressor. Alternatively, machine 102 may be any other machine used in a power system. In the exemplary embodiment, machine 102 rotates a drive shaft 104 coupled to a load 106, such as a generator.

In the exemplary embodiment, drive shaft 104 is at least partially supported by one or more bearings (not shown) housed within machine 102 and/or within load 106. Alternatively or additionally, the bearings may be housed within a separate support structure 108, such as a gearbox, or within any other structure or component that enables power system 100 to function as described herein.

In the exemplary embodiment, power system 100 includes at least one sensor assembly 110 that measures and/or monitors at least one operating condition of machine 102, of drive shaft 104, of load 106, and/or of any other component of power system 100 that enables system 100 to function as described herein. More specifically, in the exemplary embodiment, sensor assembly 110 is a proximity sensor assembly 110 positioned in close proximity to drive shaft 104 for measuring and/or monitoring a distance (not shown in FIG. 1) defined between drive shaft 104 and sensor assembly 110. Moreover, in the exemplary embodiment, sensor assembly 110 uses microwave signals to measure a proximity, such as a static and/or vibration proximity, of a component of power system 100 with respect to sensor assembly 110. As used herein, the term "microwave" refers to a signal or a component that receives and/or transmits signals having one or more frequencies between about 300 Megahertz (MHz) and about 300 Gigahertz (GHz). Alternatively, sensor assembly 110 may measure and/or monitor any other component of power system 100, and/or may be any other sensor or transducer assembly that enables power system 100 to function as described herein. In the exemplary embodiment, each sensor assembly 110 is positioned in any location within power system 100. Moreover, in the exemplary embodiment, at least one sensor assembly 110 is coupled to a diagnostic system 112 for use in processing and/or analyzing one or more signals generated by sensor assemblies 110.

During operation, in the exemplary embodiment, the operation of machine 102 may cause one or more components of power system 100, such as drive shaft 104, to change position with respect to at least one sensor assembly 110. For example, vibrations may be induced to the components and/or the components may expand or contract as the operating temperature within power system 100 changes. In the exemplary embodiment, sensor assemblies 110 measure and/or monitor the proximity and/or the position of the components relative to each sensor assembly 110 and transmit a signal representative of the measured proximity and/or position of the components (hereinafter referred to as a "proximity measurement signal") to diagnostic system 112 for processing and/or analysis.

Figure 2:
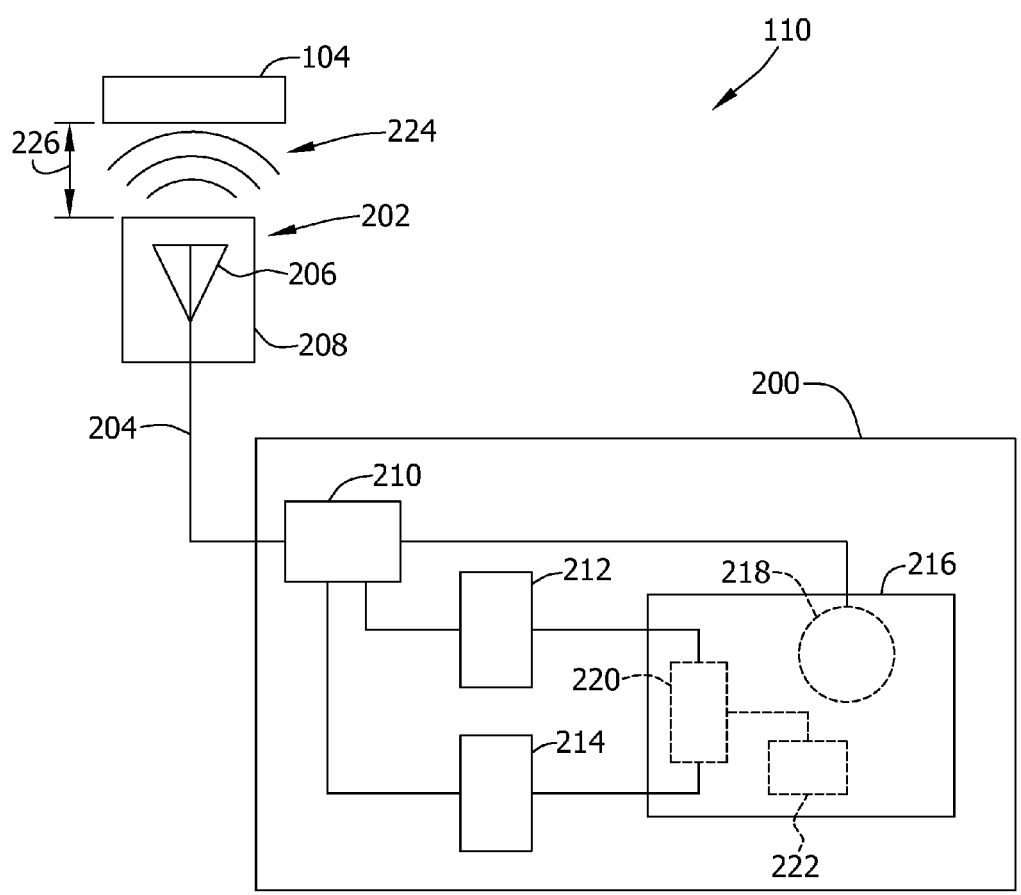
FIG. 2 is a block diagram of an exemplary sensor assembly that may be used with the power system shown in FIG. 1.

FIG. 2 is a schematic diagram of an exemplary sensor assembly 110 that may be used with power system 100 (shown in FIG. 1). In the exemplary embodiment, sensor assembly 110 includes a signal processing device 200 and a probe 202 coupled to signal processing device 200 via a data conduit 204. Moreover, in the exemplary embodiment, probe 202 includes an emitter 206 coupled to and/or positioned within a probe housing 208. More specifically, in the exemplary embodiment, probe 202 is a microwave probe 202 that includes a microwave emitter 206. As such, in the exemplary embodiment, emitter 206 has at least one resonant frequency within a microwave frequency range.

In the exemplary embodiment, signal processing device 200 includes a directional coupling device 210 coupled to a transmission power detector 212, to a reception power detector 214, and to a signal conditioning device 216. Moreover, in the exemplary embodiment, signal conditioning device 216 includes a signal generator 218, a subtractor 220, and a linearizer 222. Emitter 206 emits an electromagnetic field 224 when a microwave signal is transmitted through emitter 206.

During operation, in the exemplary embodiment, signal generator 218 generates at least one electrical signal having a microwave frequency (hereinafter referred to as a "microwave signal") that is equal or approximately equal to the resonant frequency of emitter 206. Signal generator 218 transmits the microwave signal to directional coupling device 210. Directional coupling device 210 transmits the microwave signal to transmission power detector 212 and to emitter 206. As the microwave signal is transmitted through emitter 206, electromagnetic field 224 is emitted from emitter 206 and out of probe housing 208. If an object, such as a drive shaft 104 or another component of machine 102 (shown in FIG. 1) and/or of power system 100 enters and/or changes a relative position within electromagnetic field 224, an electromagnetic coupling may occur between the object and field 224. More specifically, because of the presence of the object within electromagnetic field 224 and/or because of such object movement, electromagnetic field 224 may be disrupted, for example, because of an induction and/or capacitive effect induced within the object that may cause at least a portion of electromagnetic field 224 to be inductively and/or capacitively coupled to the object as an electrical current and/or charge. In such an instance, emitter 206 is detuned (i.e., a resonant frequency of emitter 206 is reduced and/or changed) and a loading is induced to emitter 206. The loading induced to emitter 206 causes a reflection of the microwave signal (hereinafter referred to as a "detuned loading signal") to be transmitted through data conduit 204 to directional coupling device 210. In the exemplary embodiment, the detuned loading signal has a lower power amplitude and/or a different phase than the power amplitude and/or the phase of the microwave signal. Moreover, in the exemplary embodiment, the power amplitude of the detuned loading signal is dependent upon the proximity of the object to emitter 206. Directional coupling device 210 transmits the detuned loading signal to reception power detector 214.

In the exemplary embodiment, reception power detector 214 determines an amount of power based on and/or contained within the detuned loading signal and transmits a signal representative of the detuned loading signal power to signal conditioning device 216. Moreover, transmission power detector 212 determines an amount of power based on and/or contained within the microwave signal and transmits a signal representative of the microwave signal power to signal conditioning device 216. In the exemplary embodiment, subtractor 220 receives the microwave signal power and the detuned loading signal power, and calculates a difference between the microwave signal power and the detuned loading signal power. Subtractor 220 transmits a signal representative of the calculated difference (hereinafter referred to as a "power difference signal") to linearizer 222. In the exemplary embodiment, an amplitude of the power difference signal is proportional, such as inversely or exponentially proportional, to a distance 226 defined between the object, such as drive shaft 104, within electromagnetic field 224 and probe 202 and/or emitter 206 (i.e., distance 226 is known as the object proximity). Depending on the characteristics of emitter 206, such as, for example, the geometry of emitter 206, the amplitude of the power difference signal may at least partially exhibit a non-linear relationship with respect to the object proximity.

In the exemplary embodiment, linearizer 222 transforms the power difference signal into a voltage output signal (i.e., the "proximity measurement signal") that exhibits a substantially linear relationship between the object proximity and the amplitude of the proximity measurement signal. Moreover, in the exemplary embodiment, linearizer 222 transmits the proximity measurement signal to diagnostic system 112 (shown in FIG. 1) with a scale factor suitable for processing and/or analysis within diagnostic system 112. In the exemplary embodiment, the proximity measurement signal has a scale factor of volts per millimeter. Alternatively, the proximity measurement signal may have any other scale factor that enables diagnostic system 112 and/or power system 100 to function as described herein.

Figure 3:
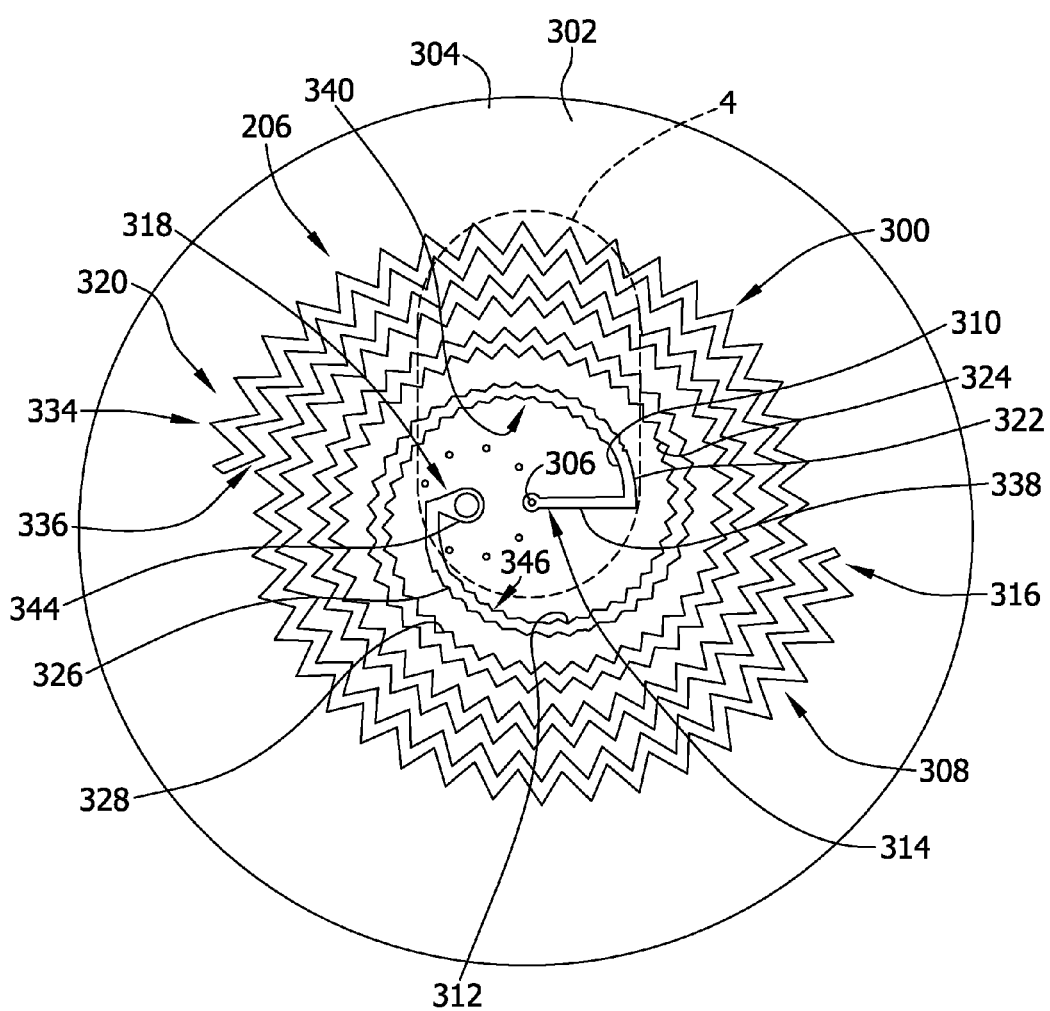
FIG. 3 is a front view of an exemplary microwave emitter that may be used with the sensor assembly shown in FIG. 2.
Figure 4:
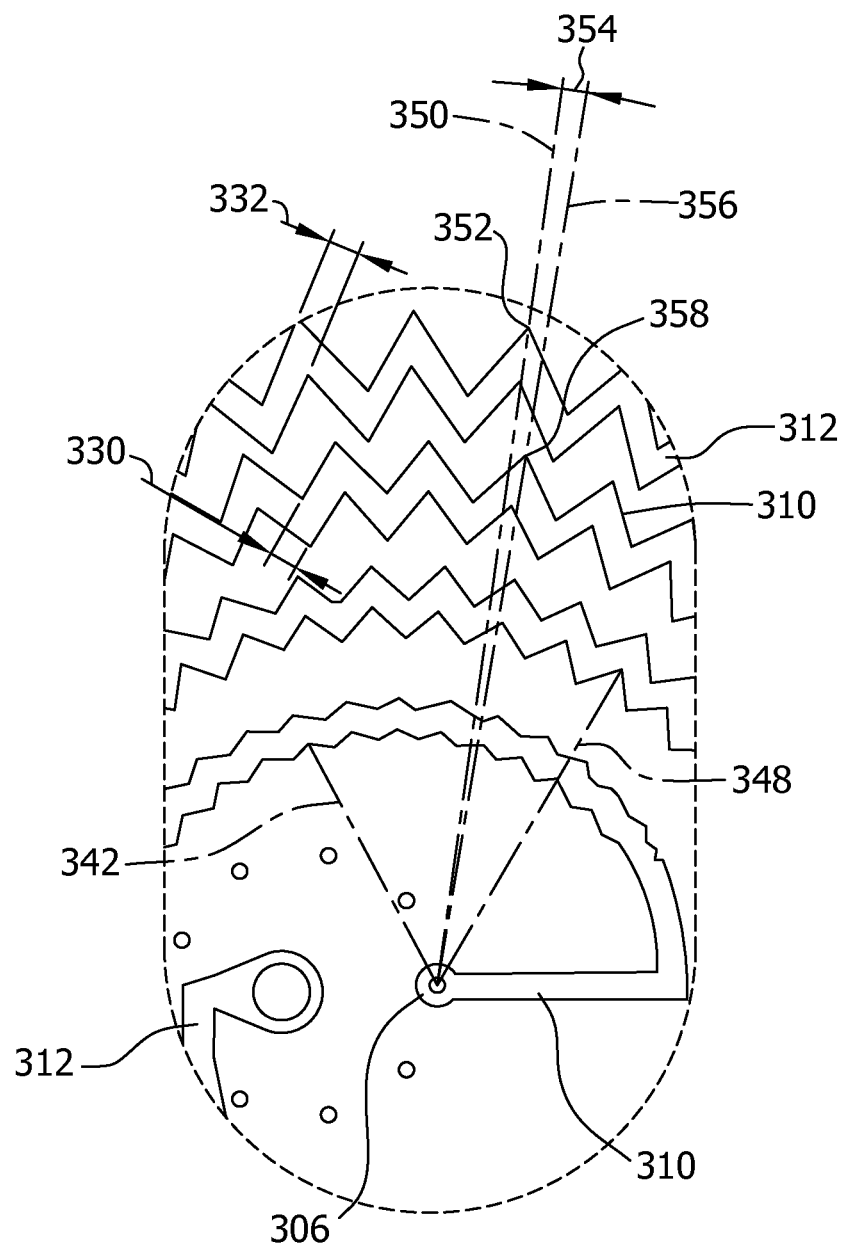
FIG. 4 is an enlarged partial view of the microwave emitter shown in FIG. 3.
Figure 5:
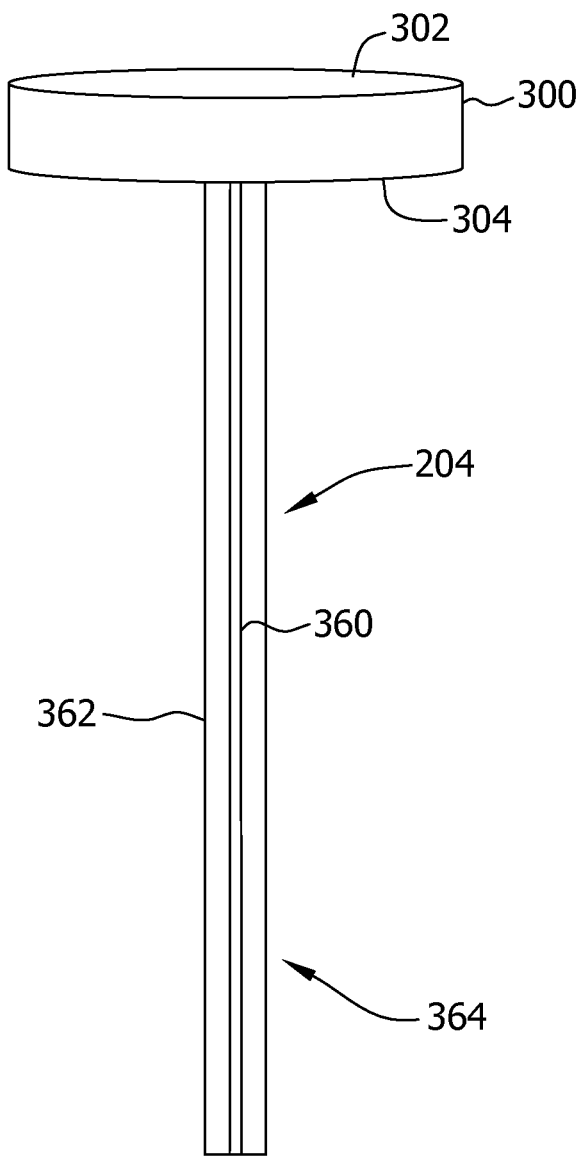
FIG. 5 is a perspective view of an exemplary emitter body that may be used with the sensor assembly shown in FIG. 2.

FIG. 3 is a front view of an exemplary microwave emitter 206 and an emitter body 300 that may be used with sensor assembly 110 (shown in FIG. 2). FIG. 4 is an enlarged partial view of emitter 206. FIG. 5 is a perspective view of exemplary emitter body 300 and data conduit 204 that may be used with sensor assembly 110. In the exemplary embodiment, emitter body 300 is positioned within, and/or is coupled to, probe housing 208 (shown in FIG. 2). Moreover, emitter 206 is coupled to emitter body 300.

In the exemplary embodiment, emitter body 300 includes a front surface 302 and an opposing rear surface 304. Emitter 206, in the exemplary embodiment, is coupled to front surface 302 and extends radially outward from a center 306 of front surface 302. More specifically, in the exemplary embodiment, emitter body 300 is a substantially planar printed circuit board, and emitter 206 includes one or more traces or conductors 308 that are formed integrally with, and/or coupled to, emitter body front surface 302. Alternatively, emitter 206 and/or emitter body 300 may be configured and/or constructed in any other arrangement that enables sensor assembly 110 to function as described herein.

Moreover, in the exemplary embodiment, conductors 308 form a first arm 310 and a second arm 312 that each extend radially outward from center 306. First arm 310 includes a first end 314 positioned proximate to center 306, and a second end 316 positioned radially outward from center 306. Second arm 312 includes a first end 318 positioned proximate to center 306, and a second end 320 positioned radially outward from center 306. Moreover, in the exemplary embodiment, first arm 310 and second arm 312 are substantially coplanar with front surface 302 such that emitter 206 does not extend a substantial distance axially outward from front surface 302. Alternatively, emitter 206 and/or emitter body 300 may include any number of emitter arms and/or may be any shape that enables microwave sensor assembly 110 to function as described herein.

First arm 310 and second arm 312, in the exemplary embodiment, are radially interleaved with each other. More specifically, first arm 310 and second arm 312 are interleaved with each other about center 306. As such, a radially outer edge 322 of first arm 310 is substantially bounded by a radially inner edge 324 of second arm 312, and a radially outer edge 326 of second arm 312 is substantially bounded by a radially inner edge 328 of first arm 310. Moreover, arms 310 and 312 have a substantially spiral shape about center 306 as arms 310 and 312 extend radially outward from center 306 in a counterclockwise direction. Alternatively, first arm 310 and/or second arm 312 may have any shape and/or configuration that enables emitter 206 to function as described herein. In the exemplary embodiment, a width 330 of first arm 310 and a width 332 of second arm 312 are substantially equal to each other, and are substantially constant as arms 310 and 312 extend outward from center 306. Alternatively, widths 330 and 332 are different from each other, and/or width 330 and/or width 332 changes as arms 310 and 312 extend outward from center 306. In one embodiment, width 330 and width 332 increase as arms 310 and 312 extend outward from center 306.

Moreover, first arm 310 and second arm 312 each include at least one peak 334 and at least one trough 336. More specifically, in the exemplary embodiment, first arm 310 includes a coupling portion 338 and a spiral portion 340 that spirals radially outward about center 306 with alternating peaks 334 and troughs 336 that progressively increase in amplitude as a radius 342 from center 306 to inner edge 328 increases. Second arm 312 includes a coupling portion 344 and a spiral portion 346 that spirals radially outward about center 306 with alternating peaks 334 and troughs 336 that progressively increase in amplitude as a radius 348 from center 306 to inner edge 324 increases. As such, first arm 310 and second arm 312 are each formed with a spiral "zigzag" pattern, or a substantially spiral shape with a "zigzag" pattern superimposed thereon, that provides an increased electrical length within a compact emitter body 300 as compared to emitters that do not have a spiral zigzag pattern.

In the exemplary embodiment, peaks 334 and troughs 336 of first arm 310 are not aligned with peaks 334 and troughs 336 of second arm 312. More specifically, a radius 350 extending from center 306 and bisecting a radially outer peak 352 of second arm 312 is offset an angular distance 354 from a radius 356 extending from center 306 and bisecting a radially inner peak 358 of first arm 310. As such, a reduced amount of capacitive coupling is present between first arm 310 and second arm 312 and a reduced amount of energy is confined within emitter body 300 and/or within first arm 310 and second arm 312 as compared to an emitter that may include peaks 334 and/or troughs 336 that are aligned with each other. Accordingly, an increased amount of the energy from the microwave signal may be transmitted to electromagnetic field 224 as compared to prior art emitters.

In the exemplary embodiment, data conduit 204 includes an inner conductor 360, and an outer conductor 362 that substantially encloses inner conductor 360 such that conductors 360 and 362 are coaxial. Moreover, in the exemplary embodiment, data conduit 204 is a semi-rigid cable 364 that couples emitter 206 to signal processing device 200 (shown in FIG. 2). Alternatively, data conduit 204 is any other cable or conduit that enables sensor assembly 110 to function as described herein. In the exemplary embodiment, first arm 310 is coupled to inner conductor 360 via coupling portion 338, and second arm 312 is coupled to outer conductor 362 via coupling portion 344.

During operation, at least one microwave signal is transmitted to emitter 206 via data conduit 204. The microwave signal is transmitted to first arm 310 and second arm 312 via inner conductor 360 and outer conductor 362, respectively. As the microwave signal is transmitted through first arm 310 and second arm 312, an electromagnetic field 224 (shown in FIG. 2) is emitted. A proximity measurement is determined based on a loading induced to emitter 206, as described more fully above. The substantially spiral zigzag pattern of emitter 206 provides an increased electrical length within a compact emitter body 300 as compared to prior art emitters. Moreover, the spiral zigzag pattern of emitter 206 and the non-aligned peaks 334 and troughs 336 of first arm 310 and second arm 312 facilitate emitting an increased amount of electromagnetic energy to electromagnetic field 224 as compared to prior art emitters.

The above-described embodiments provide an efficient and cost-effective sensor assembly for use in measuring the proximity of a machine component. The sensor assembly energizes an emitter with a microwave signal. The emitter includes two arms that spiral radially outward from a center of the emitter in a zigzag pattern. When an object, such as a machine component, is positioned within the field, a loading is induced to the emitter due to a disruption of the field. The sensor assembly calculates a proximity of the object to the emitter based on the loading induced to the emitter. In contrast to known emitters that do not include a spiral zigzag pattern, the microwave emitter described herein enables an increased amount of energy to be emitted towards the object. As such, the microwave emitter facilitates providing a stable electromagnetic field for use in measuring the proximity between the object and the emitter.

Exemplary embodiments of a sensor assembly and a microwave emitter are described above in detail. The sensor assembly and emitter are not limited to the specific embodiments described herein, but rather, components of the sensor assembly and/or the emitter may be utilized independently and separately from other components and/or steps described herein. For example, the emitter may also be used in combination with other measuring systems and methods, and is not limited to practice with only the sensor assembly or the power system as described herein. Rather, the exemplary embodiment can be implemented and utilized in connection with many other measurement and/or monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A microwave emitter for use in a microwave sensor assembly that includes an emitter body, said microwave emitter comprising:
   a first arm coupled to the emitter body, said first arm extending radially outward from the emitter body, said first arm is at least partially non-linear and comprises at least one peak and at least one trough; and
   a second arm coupled to the emitter body, said second arm extending radially outward from the emitter body, said second arm comprises at least one peak and at least one trough, wherein said first arm and said second arm generate an electromagnetic field when at least one microwave signal is received.

2. A microwave emitter in accordance with claim 1, wherein said first arm and said second arm each has a spiral shape that extends radially outward from a center of the emitter body.

3. A microwave emitter in accordance with claim 1, wherein said first arm has a spiral shape that extends radially outward from a center of the emitter body in a first direction, and said second arm has a spiral shape that extends radially outward from the center in the first direction.

4. A microwave emitter in accordance with claim 1, wherein said first arm is interleaved with said second arm about a center of the emitter body.

5. A microwave emitter in accordance with claim 1, wherein said first arm and said second arm each has a spiral shape that extends radially outward from a center of the emitter body in a zigzag pattern.

6. A microwave emitter in accordance with claim 5, wherein the zigzag pattern forms a plurality of peaks within said first arm and said second arm, and wherein said peaks of said first arm and said peaks of said second arm increase in amplitude as said first arm and said second arm extend outward from the center.

7. A microwave emitter in accordance with claim 6, wherein said peaks of said first arm are not aligned with said peaks of said second arm with respect to a radius extending from the center.

8. A microwave sensor assembly comprising:
   an emitter body;
   a microwave emitter coupled to said emitter body, said microwave emitter comprising:
      a first arm extending radially outward from said emitter body, said first arm at least partially non-linear and comprising at least one peak and at least one trough; and
      a second arm extending radially outward from said emitter body, said second arm comprises at least one peak and at least one trough, wherein said first arm and said second arm generate an electromagnetic field when at least one microwave signal is received; and
   a signal processing device coupled to said microwave emitter for transmitting at least one microwave signal to said microwave emitter and for calculating a proximity measurement based on a signal received from said microwave emitter.

9. A microwave sensor assembly in accordance with claim 8, further comprising a semi-rigid cable that couples said microwave emitter to said signal processing device, said semi-rigid cable comprises an inner conductor and an outer conductor.

10. A microwave sensor assembly in accordance with claim 9, wherein said inner conductor is coupled to said first arm and said outer conductor is coupled to said second arm.

11. A microwave sensor assembly in accordance with claim 8, wherein said first arm and said second arm each has a spiral shape that extends radially outward from a center of said emitter body.

12. A microwave sensor assembly in accordance with claim 8, wherein said first arm has a spiral shape that extends radially outward from a center of said emitter body in a first direction, and said second arm has a spiral shape that extends radially outward from the center in the first direction.

13. A microwave sensor assembly in accordance with claim 8, wherein said first arm is interleaved with said second arm about a center of said emitter body.

14. A microwave sensor assembly in accordance with claim 8, wherein said first arm and said second arm each has a spiral shape that extends radially outward from a center of said emitter body in a zigzag pattern.

15. A microwave sensor assembly in accordance with claim 14, wherein the zigzag pattern forms a plurality of peaks within said first arm and said second arm, and wherein said peaks of said first arm and said peaks of said second arm increase in amplitude as said first arm and said second arm extend outward from the center.

16. A microwave sensor assembly in accordance with claim 15, wherein said peaks of said first arm are not aligned with said peaks of said second arm with respect to a radius extending from the center.

17. A power system comprising:
   a machine;
   a microwave probe positioned with respect to said machine, said microwave probe comprising:
      an emitter body;
      a microwave emitter coupled to said emitter body, said microwave emitter comprising:
         a first arm extending radially outward from said emitter body, said first arm at least partially non-linear and comprising at least one peak and at least one trough; and
         a second arm extending radially outward from said emitter body, said second arm comprises at least one peak and at least one trough, wherein said first arm and said second arm generate an electromagnetic field when at least one microwave signal is received; and
   a signal processing device coupled to said microwave emitter for transmitting at least one microwave signal to said microwave emitter and for calculating a proximity measurement of a component of said machine based on a signal received from said microwave emitter.

18. A power system in accordance with claim 17, wherein a width of said first arm and a width of said second arm are substantially constant as said first arm and said second arm extend radially outward from a center of said emitter body.

19. A power system in accordance with claim 17, wherein said first arm and said second arm each has a spiral shape that extends radially outward from a center of said emitter body in a zigzag pattern.

20. A power system in accordance with claim 19, wherein the zigzag pattern forms a plurality of peaks within said first arm and said second arm, and wherein said peaks of said first arm and said peaks of said second arm increase in amplitude as said first arm and said second arm extend outward from the center.

* * * * *